United States Patent [19]

Oyamada et al.

[11] 4,353,854

[45] Oct. 12, 1982

[54] METHOD OF PRODUCING LARGE-SIZED CERAMIC HONEYCOMB STRUCTURE BODY BY INTEGRATION OF SMALL UNIT BLOCKS

[75] Inventors: Akira Oyamada, Yokosuka; Shin Fujii, Zama; Nobuhiko Okoshi, Tochigi; Satoshi Ambe, Yokosuka; Shigeyoshi Nakagawa, Isesaki, all of Japan

[73] Assignee: Nissan Motor Company, Japan

[21] Appl. No.: 213,451

[22] Filed: Dec. 5, 1980

Related U.S. Application Data

[63] Continuation of Ser. No. 34,072, Apr. 27, 1979, abandoned.

[30] Foreign Application Priority Data

May 2, 1978 [JP] Japan ................................. 53-52350

[51] Int. Cl.³ ............................................. C04B 37/00
[52] U.S. Cl. ...................................... 264/63; 264/56; 264/66
[58] Field of Search ..................... 264/56, 60, 63, 66, 264/67; 425/464, 467

[56] References Cited

U.S. PATENT DOCUMENTS

| | | | |
|---|---|---|---|
| 3,137,602 | 6/1964 | Lincoln | 156/89 |
| 3,819,439 | 6/1974 | Taylor | 156/89 |
| 3,899,326 | 8/1975 | Frost et al. | 264/67 |
| 4,017,347 | 4/1977 | Cleveland | 156/89 |
| 4,025,462 | 5/1977 | Cleveland | 252/477 |
| 4,046,612 | 9/1977 | Warner et al. | 156/205 |
| 4,055,451 | 10/1977 | Cockbain et al. | 156/89 |
| 4,162,285 | 7/1979 | Tanabashi | 264/66 |

FOREIGN PATENT DOCUMENTS

39-10634 7/1964 Japan .
931096 6/1958 United Kingdom .

Primary Examiner—Donald E. Czaja
Assistant Examiner—W. Thompson
Attorney, Agent, or Firm—Schwartz, Jeffery, Schwaab, Mack, Blumenthal & Koch

[57] ABSTRACT

A method of producing a large-sized body of a ceramic honeycomb structure, comprising the steps of integrating unfired unit blocks each having a prismatic shape and a honeycomb structure with axial gas passages into a large-sized body by bonding the unit blocks to one another with a bonding agent and firing this body. The unit blocks are formed of a ceramic composition consisting of a powdered ceramic material and completely gasifiable substances, and essential components of the bonding agent are also completely gasifiable substances such as a combination of an organic binder material used in the ceramic composition and a solvent for this binder material. The gasifiable substances present in the large-sized body are completely dissipated by heating before the occurrence of sintering of the ceramic material by firing, so that the fired product is a wholly and homogeneously ceramic body of a honeycomb structure highly resistant to thermal shocks.

18 Claims, 10 Drawing Figures

METHOD OF PRODUCING LARGE-SIZED CERAMIC HONEYCOMB STRUCTURE BODY BY INTEGRATION OF SMALL UNIT BLOCKS

This is a continuation, of application Ser. No. 34,072, filed Apr. 27, 1979, now abandoned.

BACKGROUND OF THE INVENTION

This invention relates to a method of producing a large-sized body of a ceramic honeycomb structure by integration of small-sized honeycomb structure blocks. For example, the large-sized body may be a heat regenerator of a rotary regenerative heat exchanger for either a gas turbine engine or a Stirling engine or a catalyst carrier for an exhaust gas treatment apparatus either in an automobile or in a factory.

A honeycomb structure of a ceramic material is of use, for example, as a regenerator matrix in air preheaters or heat exchangers. Conventionally, a large-sized body of a ceramic honeycomb structure is produced by first producing a plurality of small-sized blocks of the honeycomb structure through firing of molded blocks and then integrating the small blocks into a large-sized body as intended by bonding the small blocks to one another with a ceramic cement of which principal component is a virteous composition. This method is disclosed in Japanese Examined Patent Application Publication No. 39(1964)-10634. However, the product of this method has a shortcoming that it is rather poor in resistance to thermal shocks. In an automotive gas turbine engine by way of example, a honeycomb regenerator body is subjected to exhaust gas temperatures as high as about 1000° C. and severe thermal shocks at the start and stop of the engine. When the regenerator body is a ceramic body made up of small blocks adhered to one another, this body is liable to break in the bonded regions by the influence of thermal shocks. From such a viewpoint, large-sized ceramic honeycomb structure bodies produced by conventional methods are not yet practicable in combustion engines.

Ceramic honeycomb structures are of use also as catalyst carriers in exhaust gas treatment apparatus. Where such apparatus are large in size as in factories and other large-scale facilities, the catalyst carriers are formed into large-sized bodies by the aforementioned bond-integration method. Also in this field, large-sized ceramic honeycomb structure bodies are frequently damaged or broken by thermal shocks.

In general, resistance to thermal shocks becomes a matter of more significant importance to ceramic articles than to metal articles since usually ceramic articles are used at higher temperatures because of their superior refractoriness and accordingly are subjected to thermal shocks or greater intensity. Among physical properties of the material of a rigid and integral article, heat conductivity and thermal expansion coefficient have the most significant influences on the resistance to thermal shocks of the article. If the heat conductivity were infinitely great, the article could be heated and cooled ideally uniformly, so that there is no possibility of the article breaking by thermal stresses attributable to thermal shocks. In reality, however, the heat conductivity never becomes infinitely great. Therefore, it is a common practice to select a material (in this case a ceramic material) having a thermal expansion coefficient as small as possible with the intention of obtaining a product high in resistance to thermal shocks, considering that the magnitude of a thermal stress appearing in the article as the result of nonuniform heating and/or nonuniform cooling becomes small where the article is made of a material having a sufficiently small coefficient of expansion.

A fundamental problem in the conventional bond-integration method of producing a large-sized ceramic honeycomb body is that there is no practicable cement or adhesive identical in thermal expansion coefficient with the ceramic material of the small honeycomb structure blocks to be bonded together. The use of a ceramic cement containing a vitreous composition inevitably results in the presence of heterogeneous regions (bonded regions) in the large-sized product, so that the product remains unsatisfactory in its resistance to thermal shocks.

As another method of producing a large-sized body of a ceramic honeycomb structure, Japanese Examined Patent Application Publication No. 39(1964)-17393 proposes to fix a plurality of small ceramic honeycomb blocks to a metal frame having lattice-like walls by using a plastic composition of which principal ingredient is a ceramic material as a cement. However, the product of this method will have disadvantages such as undesirably high resistance to a gas flow therethrough due to the use of the metal frame, difficulty in tightly bonding the small ceramic blocks to the metal frame due to a great difference in thermal expansion characteristic between the ceramic and the metal and, by reason of such difficulty, significant wear of the unit blocks and the cement where the product is subjected to mechanical vibrations during use.

Accordingly there is an earnest desire for a novel method of producing large-sized bodies of a ceramic honeycomb structure having improved strength and durability.

SUMMARY OF THE INVENTION

It is an object of the present invention to provide an improved method of producing a large-sized body of a ceramic honeycomb structure, which method gives a product entirely homogeneous and accordingly high in resistance to thermal shocks and can be performed readily by the use of a relatively small-scaled molding apparatus.

According to the invention, a method of producing a large-sized body of a ceramic honeycomb structure comprises the following steps. First, a plurality of unit blocks each having a prismatic shape and a honeycomb structure providing a number of continuous and axially extending gas passages are integrated into a large-sized body of a desired shape by bonding the unit blocks to one another with a bonding agent. The unit blocks are formed of a ceramic composition comprising a powdered ceramic material and an organic binder material, which can be entirely converted into gaseous substances by firing, and integrated while in an unfired state. The bonding agent comprises only two essential components which are the organic binder material and a liquid which serves as a solvent for the binder material. Then the large-sized body is heated so as to dissipate the binder. Thereafter, the heated body is fired at a higher temperature so as to cause sintering of the integrated blocks thereby to convert the body into an entirely homogeneous ceramic body.

Preferably the unit blocks are formed by extrusion molding of a ceramic composition comprising the powered ceramic material, the binder material and a solvent for the binder material and thereafter dried to evaporate the solvent. When necessary, the dried unit blocks are subjected to machining for adjustment of their shape and dimensions in preparation for the integration by bonding.

The integration of the unit blocks can be accomplished by using a solution of the organic binder material in the above defined liquid as the bonding agent, and this bonding agent may optionally contain the powdered ceramic material dispersed therein. As a modification, the above defined liquid alone may be applied onto a side face of each unit block, and the unit block is left for a while in the wetted state until dissolution of a portion of the organic binder material present in the wetted unit block into the applied liquid, with the result that the bonding agent is prepared on the surface of each unit block. Also in this case, the powdered ceramic material may optionally be dispersed in the liquid prior to application of the liquid to the unit blocks.

As will be understood from the above statements, a primary feature of the invention resides in that the honeycomb structure unit blocks, which are formed of a composition containing no ingredient of a kind that will become a substance foreign to an intended ceramic structure in a final product, are integrated into a large-sized body, prior to firing, with a bonding agent also containing no ingredient of a kind that will become a substance foreign to the intended ceramic structure. Therefore, this method gives a large-sized body of a ceramic honeycomb structure which is wholly homogeneous and accordingly exhibits a remarkably high resistance to thermal shocks.

DESCRIPTION OF THE PREFERRED EMBODIMENTS

Figure 1:
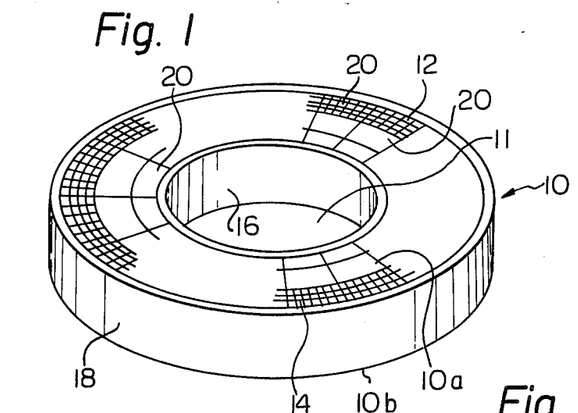
FIG. 1 is a diagrammatic perspective view of an example of large-sized honeycomb structure bodies produced by a method according to the invention.
Figure 2:
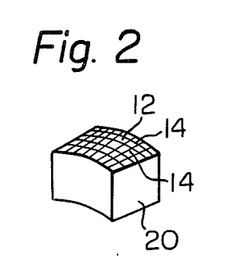
FIG. 2 is a diagrammatic perspective view of a unit block of a honeycomb structure which is a constituent of the large-sized body of FIG. 1.

As an example of large-sized ceramic honeycomb structure bodies produced by a method according to the invention, FIG. 1 shows a cylindrical or annular body 10 of a ceramic honeycomb structure which serves as an element of an axial flow type heat exchanger. This body 10 consists fundamentally of lattice-like thin walls 14 of a ceramic material extending axially of the body 10 from the top end face 10a to the bottom end face 10b so as to define a multitude of narrow gas passages 12 each of which opens at the both end faces 10a and 10b and extends parallel to the central axis of the annular body 10. Indicated at 11 is a central shaft hole of this body 10. This large-sized body 10 is produced by integration of a large number of small-sized unit blocks 20 each sharing a part of the lattice-like walls 14, and accordingly a part of the multitude of gas passages 12, of the whole body 10. As shown in FIG. 2, each of these unit blocks 20 has the shape of a prism latticed and generally trapezoidal in cross-section. (More strictly, each unit block 20 has two concentrically arcuate sides and two radial sides.) As can be seen in FIG. 1, the annular body 10 is constructed of several groups of unit blocks 20 similar in cross-sectional shape but different in cross-sectional dimensions. An inner peripheral wall 16 and an outer peripheral wall 18 of the annular body 10 may be formed after assemblage of the unit blocks 20, but alternatively the blocks 20 in the radially innermost and outermost positions may be designed each to have an arcuate side wall thick enough to serve as a part of the inner peripheral wall 16 or the outer peripheral wall 18.

Figure 3:
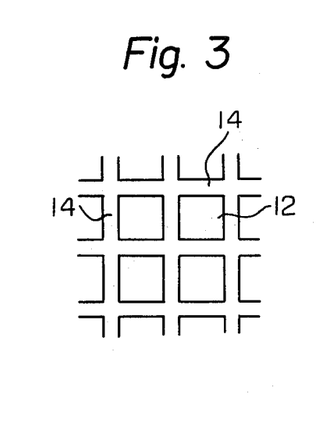
FIG. 3 is a fragmentary and enlarged end view of a honeycomb structure unit block principally analogous to the block of FIG. 2.
Figure 4:
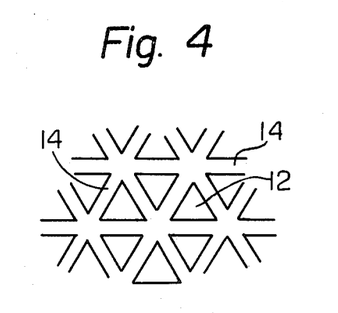
FIG. 4 is a fragmentary and enlarged end view of a still differently designed unit block.
Figure 5A:
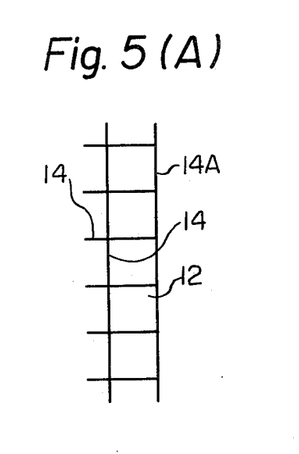
FIGS. 5(A) to 5(E) illustrate diagrammatically a bonding face of a honeycomb structure unit block in a method of the invention for five differently designed blocks, respectively.
Figure 5B:
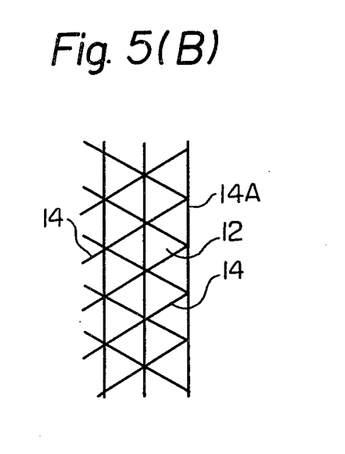
Figure 5C:
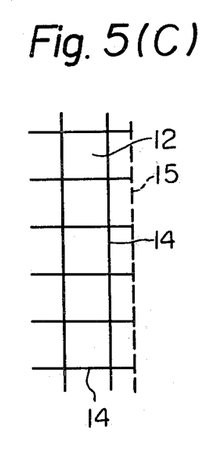
Figure 5D:
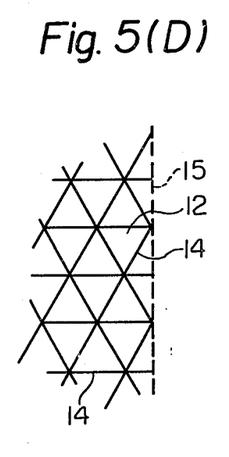
Figure 5E:
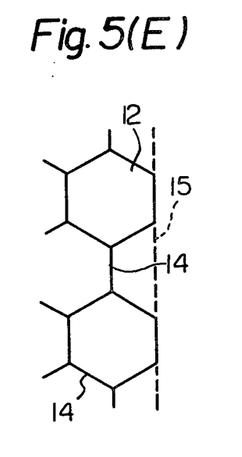
Figure 6A:
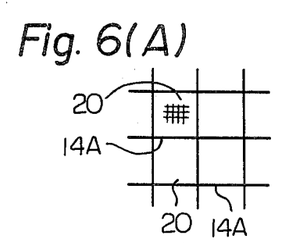
FIGS. 6(A) to 6(G), and FIGS. 7(A) and 7(B) illustrate diagrammatically nine kinds of designs in constructing a large-sized honeycomb structure body by integrating a number of unit blocks.
Figure 6B:
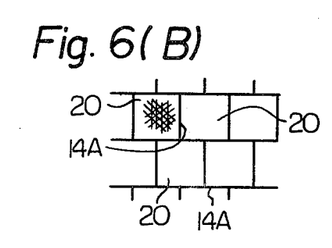
Figure 6C:
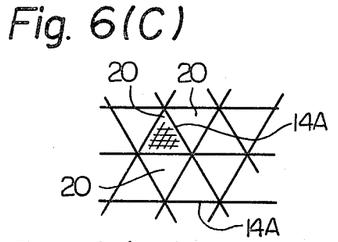
Figure 6D:
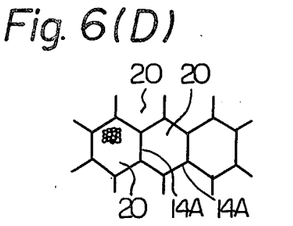
Figures 6E, 6F, 6G:
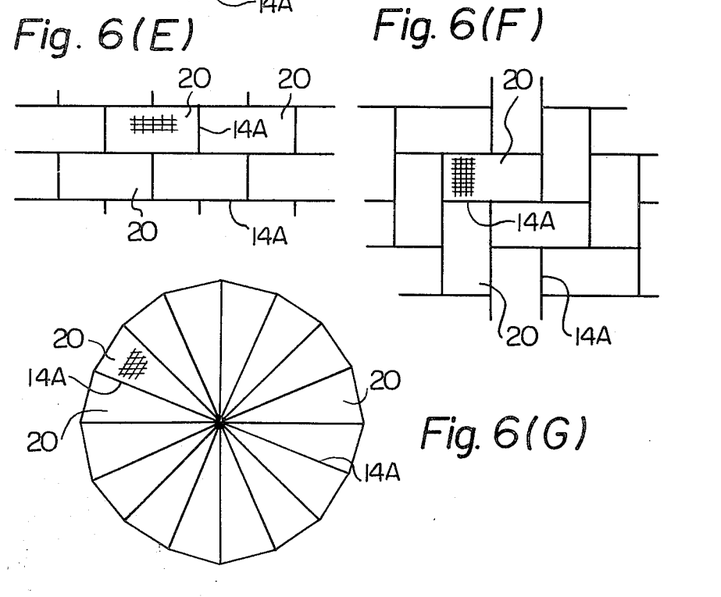

Unit blocks 20 of a ceramic honeycomb structure for use in a method of the invention are formed in a prismatic shape generally polygonal in cross-section. The cross-sectional shape of the axial and parallel gas passages 12 in each unit block 20 may be designed variously depending on the intended use of the large-sized body 10. For example, the gas passages 12 may be cross-sectionally rectangular or square as shown in FIG. 3, triangular as shown in FIG. 4, hexagonal as shown in FIG. 5(E), or even circular. The unit blocks 20 may be formed by any one of conventional methods of producing small-sized ceramic honeycomb blocks, but it is the most practical and preferred in the present invention to form the unit blocks 20 by extrusion molding of a wet ceramic composition comprising a selected ceramic material, an organic binder which can be dissipated when the composition is fired, a solvent for the binder and, optionally, certain additive or additives serving as extrusion aid(s). The extruded blocks 20 are dried to evaporate the solvent alone and thereafter subjected to machining in order to redress curving occurred during extrusion and/or distortion caused by drying and finish the blocks 20 in predetermined dimensions. As a feature of a method of the invention, the thus finished unit blocks 20 are integrated into a large-sized body prior to a firing process. The dried and machined blocks 20 are bonded to one another by the use of an adhesive, an essential component of which is the aforementioned solvent, so as to constitute a large-sized body. Usually, the bonding procedure is followed by or alternated with a drying procedure to evaporate the solvent at least partly. Then the large-sized body (which is, in a strict sense, still in a plastic state) is fired so that the organic binder may be dissipated and that the plastic body may turn into a rigid, entirely homogeneous and really ceramic body.

The preparation of unit blocks 20, the integration of the finished unit blocks and firing of the integrated blocks will be described hereinafter individually more in detail.

(1) Preparation of Unit Blocks

The presence of a binder in a ceramic composition for the molding of the unit blocks is a requisite for realization of a desired honeycomb structure. In the present invention, the binder is required to be an organic material containing no metal element because, if the binder contains any element which cannot completely be burned and dissipated at the stage of firing the integrated unit blocks, such an element remains in the ceramic matrix of the large-sized product to form heterogeneous regions different in thermal expansion characteristic from the remaining regions and will cause lowering of the physical strength of the large-sized honeycomb structure body, which is in most cases intended to be subjected to repeated thermal shocks.

For the same reason, additives such as extrusion aids (lubricating agents) as optional ingredients of the ceramic composition, too, must be selected from organic materials free of metal elements.

Examples of binder materials useful in the present invention are methyl cellulose, wheat flour, dextrin, starch, lignin extracts, spent liquor in pulp industries, gum arabic, gutta-percha rubber, tragacanth gum, polyvinyl alcohol, polyvinyl butyral, methylethyl cellulose, ceresin, casein, cellulose acetate and synthetic resins such as acrylic resins, phenol resins and vinyl resins.

Examples of useful extrusion aids are paraffin wax, microcrystalline wax, Carbowax (solid polyethylene glycol), cellulose acetate, microcrystalline cellulose and certain esters known as lubricants.

The necessity of the presence of a liquid in the ceramic composition for extrusion molding will be understood without explanation. Also it will be understood that the liquid should serve as a solvent for the binder material in this composition to allow the binder to exhibit its function. When the composition comprises an extrusion aid, selection of the solvent is made such that the extrusion aid, too, exhibits its function in the wet composition. In practice another matter of importance in selecting the solvent is the volatility of the solvent in connection with the quantity of a batch of the ceramic composition and the length of time to complete extrusion of the batch. If there occurs significant evaporation of the solvent before completion of the extrusion, the extrusion operation will suffer a considerable change in plasticity of the ceramic composition. The solvent is selected from water and various organic solvents such as alcohols, acetone, benzene, ethers, ketones and esters.

Ceramic materials conventionally employed in the production of ceramic honeycomb structures are of use also in the present invention. Of course, use should be made of a ceramic material which has a small expansion coefficient and undergoes no modification at elevated temperatures at which the final product is used.

Examples of preferable ceramic materials are $\beta$-spodumene, petalite, $\beta$-eucryptite, cordierite, and aluminum silicate.

Preferably the wet ceramic composition for preparation of the unit honeycomb blocks by extrusion molding is made to consist of 3 to 15 Wt % of organic binder, 0 to 3 Wt % of extrusion aid, 10 to 30 Wt % of solvent and the balance of powdered ceramic material. When the amount of the organic binder material in the composition is less than 3 Wt %, it becomes difficult to form the lattice-like walls of each unit block in a perfectly continuous state by extrusion molding, resulting in an increase in the number of defective blocks. On the other hand, the presence of more than 15 Wt % of binder material in the composition tends to cause cracking of the blocks when fired after integration into a large-sized body.

The ceramic composition needs not to contain any additive to serve as an extrusion aid where the thickness of the lattice-like walls of each unit block is greater than about 0.30 mm. In the case of forming the unit blocks with the lattice-like walls of a smaller thickness, the presence of an extrusion aid up to about 3 Wt % of the composition is effective for lowering the extrusion resistance of the composition and therefore obtaining the unit blocks with thin and defect-free walls.

When the amount of the solvent in the ceramic composition is less than 10 Wt %, the composition becomes too hard to extrude easily and smoothly. On the other hand the composition becomes so soft when the amount of the solvent exceeds 30 Wt % that the extruded honeycomb structure tends to bend, whereby difficulty arises in obtaining the unit blocks with straight and parallel gas passages.

Of course the cross-sectional contour of the unit blocks is determined by the fundamental shape of the extrusion die, and the pattern and thickness of the lattice-like walls of the unit blocks are determined by the pattern and width of slits in the extrusion die. There will be no need of explaining particulars of the extrusion die designing for producing the unit blocks of various designs.

The unit blocks formed by extrusion molding are dried at temperatures below about 200° C. to remove the solvent alone therefrom by evaporation. In this state, i.e. in a state before firing, the binder serves the function of binding the ceramic material particles and accordingly affording the unit blocks a physical strength sufficient to maintenance of an intended shape.

(2) Integration of Unit Blocks

The integration of a number of honeycomb structure unit blocks each having a prismatic shape by bonding them to one another with a bonding agent of the aforementioned type is the most important step in a method according to the invention.

In the present invention, the fundamental conception about bonding and integration of the unit blocks is to avoid formation of heterogeneous regions, i.e. regions different in thermal expansion characteristic from the remaining major regions, in the large-sized ceramic body obtained through a succeeding firing step. From this way of thinking, it is made essential in this invention to accomplish the integration of the above described unit blocks by the use of a bonding agent which can bond the unit blocks to one another with sufficient adhesion strength for handling of the integrated and unfired blocks and, as the matter of more importance, can be converted into gaseous substances and dissipated from the large-sized honeycomb structure body given by integration of the unit blocks by firing this body at a temperature not high enough to achieve baking or sintering of the ceramic material. A bonding agent having such properties can be obtained by dissolving the organic binder material used in the preparation of the unit blocks in a solvent. Usually, the solvent used in the ceramic composition for forming the unit blocks is used also as the solvent in the bonding agent, but it is permissible to employ a different solvent for the bonding agent insofar as this solvent can well dissolve the organic binder contained in the unit blocks to be integrated.

The essential components of a bonding agent in a method of the invention are only the same organic binder material as the one contained in the unit blocks and a solvent for this binder material, and, as will be understood readily, an optional component of this bonding agent is the ceramic material of the unit blocks. Of course, the bonding agent can be prepared in advance of the integration step, i.e. separately from the unit blocks. As a modification, however, also it is possible to prepare this bonding agent on the surfaces of the unit blocks to be bonded by applying either a selected solvent alone or a dispersion of the ceramic material in the solvent onto the surfaces of the unit blocks and leaving the blocks in the wetted state for a short period of time, usually for a few minutes, to allow the wetted surface regions to become pasty and the organic binder in these regions of the unit blocks to dissolve in the applied solvent.

In practice, therefore, bonding of a unit honeycomb block to another unit block can be done in four seemingly different ways. As the first method, a solvent alone is applied onto a side face (selected as the bonding face) of each unit block. In a few minutes the wetted surfaces become pasty, showing that the binder present in the wetted surface regions of the unit blocks has dissolved in the applied solvent. Then the two blocks are brought into contact with each other at their wetted side faces. The bonding by this method is achieved with a sufficient adhesion strength where the amount of the binder in the unit blocks (already dried) is not smaller than about 7 Wt %. The second method differs from the first method only in that a dispersion or slurry of the powdered ceramic material (one employed in the preparation of the unit blocks) in a solvent is applied to each unit block in place of the solvent in the first method. Therefore, also this method is applicable to honeycomb unit blocks comprising a relatively large amount of organic binder. As the third method, a pure solution of the organic binder used in the preparation of the unit blocks is applied onto the bonding faces of the unit blocks. This method is effective even when the content of the organic binder in the unit blocks is considerably small. In this method, the two unit blocks may be brought into contact with each other soon after the application of the binder solution thereto. The fourth method is fundamentally similar to the third method, but the solution of the organic binder contains the powdered ceramic material dispersed therein.

The choice of a bonding method out of these four methods would be made with consideration of not only the amount of the binder in the unit blocks but also the form of the bonding face of each unit block. Referring to FIGS. 5(A) and 5(B) by way of example, the first and third methods (application of a bonding agent not containing the ceramic material) are suitable where the bonding face of each unit block is a complete side face 14A given by the outermost one of the lattice-like walls 14. Where the bonding face of at least one of the unit blocks to be bonded is not a complete side face but takes the form of an incomplete or partly vacant side face 15 as shown in FIGS. 5(C) to 5(E), it is preferable to employ either the second or the fourth method (application of a bonding agent containing the ceramic material) to compensate for the smallness of an effective bonding area by the supply of the ceramic material. For the sake of confirmation, it is noted that in the present invention a unit honeycomb block having an incomplete bonding face 15 as illustrated in FIG. 5(C), 5(D) or 5(E) can be bonded either to an incomplete bonding face 15 of another unit block or to a complete bonding face 14A of another unit block.

At the integration of a number of honeycomb unit blocks into a large-sized honeycomb body, the first step is the bonding of two unit blocks to each other. After the application of a bonding agent onto the bonding faces as described above, the two blocks are brought into face-to-face contact and preferably held against each other under an adequate pressure to achieve a close contact and a good adhesion, followed by drying to evaporate the solvent thereby to afford a sufficient adhesion strength. At this step, it is undesirable to apply an unduly large quantity of bonding agent to each unit block, because the use of a large quantity of bonding agent results in the presence of a large amount of organic binder in the bonded surface region and accordingly in the development of a large quantity of gas in this region during the succeeding firing process, so that cracking or breaking tends to occur in the bonding region or in nearby portions of the lattice-like walls. It is desirable, therefore, to use the bonding agent in such a quantity that the thickness of the bonding region (an interface region between the two blocks turned into a pasty state by the application of the bonding agent) does not exceed about 3 mm.

Figures 7A, 7B, 8, 9A, 9B, 10:
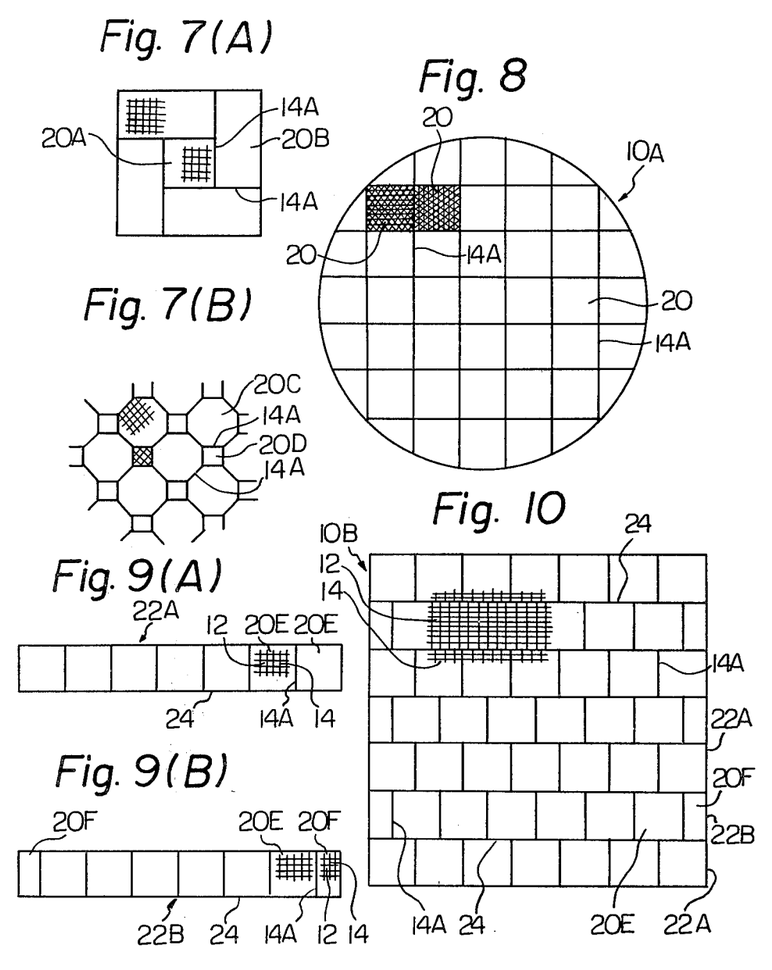
FIG. 8 is a diagrammatic end view of a large-sized honeycomb structure body produced in Example 1 of the invention described in this specification.
FIGS. 9(A) and 9(B) are respectively diagrammatic end views of two intermediate blocks of a honeycomb structure prepared in Example 3 of the invention described in this specification.
FIG. 10 is a diagrammatic end view of a large-sized body of a honeycomb structure produced by integrating certain number of blocks of FIG. 9(A) and certain number of blocks of FIG. 9(B).

Then another unit block is bonded in the same manner to the union of the two blocks. A large-sized honeycomb body may be obtained by repetition of such a procedure. In most cases, however, several pieces of unit blocks are integrated into a medium-sized block, and then a plurality of medium-sized blocks are bonded to one another so as to give a large-sized body of an intended shape. The large-sized honeycomb body may be a union of a number of unit honeycomb blocks 20 of the same shape as shown in FIGS. 6(A) to 6(G) or alternatively a union of at least two groups of unit blocks different in shape. For example, FIG. 7(A) shows a combination of a unit honeycomb block 20A square in cross-section and unit blocks 20B rectangular in cross-section, and FIG. 7(B) shows a combination of cross-sectionally hexagonal unit blocks 20C and cross-sectionally square unit blocks 20D.

When necessary, the large-sized body obtained by the above described integration procedure is subjected to machining such as lathing and/or milling so as to finish this body into a desired shape and desired dimensions.

(3) Firing

In a firing process in a method of the invention, a matter of importance is that the organic binder (the optional additive(s), too) must be completely removed from the integrated honeycomb structure body before this body is heated to a temperature high enough to cause sintering of the ceramic material, and another matter of importance is to uniformly heat the large-sized body.

Considering the first matter, a two-stage firing process is employed in the present invention. At an initial stage, the large-sized honeycomb body is heated slowly to a first temperature high enough to gasify of the organic substance(s) contained in this body through combustion or thermal decomposition but not high enough to sinter the ceramic material and kept at this temperature for a certain period of time to allow complete dissipation of the organic substance(s). The heating to the first temperature should be carried out at a sufficiently low rate of temperature rise because a rapid heating brings about an abrupt gasification of a largeamount of the organic substance(s) and, hence, may cause cracking of the heated body.

At the later stage of the firing process the temperature is raised gradually from the first temperature to a second temperature at which the ceramic material can be sintered thoroughly. Uniform heating of the large-sized body is particularly important at this stage. Since the organic binder has been entirely removed from the large-sized body, now this body is constituted of the ceramic material alone and the shape of this body is retained merely by frictional adhesion of the individual ceramic material particles with one another. If this body in such a fragile state is rapidly heated to a sintering temperature, sintering will be promoted only locally accompanied by cracking of the heated body in regions between the sintered and unsintered portions. After completion of the dissipation of the organic binder by the first stage heating, therefore, the large-sized body must be heated to the second temperature as slowly as practically possible. Besides, the honeycomb body may be disposed in a container such as an annealing box to further ensure slow and uniform heating of the body. Of course the second temperature is determined according to the kind of the ceramic material to be sintered, and the firing process is completed by maintaining the large-sized body at the second temperature for a period of time sufficient for transformation of this body into a perfectly ceramic body.

The large-sized ceramic honeycomb structure body obtained through the firing process is finished into an intended article of predetermined dimensions by machining such as lathing and/or milling.

As will be understood from the foregoing description, a large-sized body of a ceramic honeycomb structure produced by a method of the invention is wholly homogeneous and accordingly exhibits a remarkably high resistance to thermal shocks. Besides, a method of the invention is easy to perform and does not need the use of a large-sized apparatus for forming a large-sized ceramic honeycomb structure body.

The invention will be further illustrated by the following Examples.

EXAMPLE 1

A ceramic composition was prepared by mixing 62 parts by weight of powdered cordierite (ceramic material), 8 parts by weight of methyl cellulose (organic binder), 2 parts by weight of microcrystalline wax (extrusion aid) and 28 parts by weight of water (solvent). Unit blocks of a honeycomb structure having 0.20 mm thick walls arranged to form cross-sectionally equilateral triangular gas passages with a pitch of 2.0 mm were formed by extrusion molding of this ceramic composition, followed by drying by high frequency heating. The unit blocks were finished each into the shape of an 85×85 mm wide and 100 mm long square prism by machining on a milling machine.

The unit blocks were bonded to one another by first applying water onto a side face of each block, leaving each block in the wetted state for 2 minutes to allow the wetted surface to become pasty with dissolution of methyl cellulose in the applied water, then contacting the wetted side face of one block with the corresponding side face of another block and thereafter drying the bonded blocks with the maintenance of a bonding pressure of about 50 g/cm². By repeating this procedure, 49 pieces of unit blocks were integrated into a honeycomb structure body in the shape of a square plate about 580×580 mm wide and 100 mm thick. Then this body was machined by means of a lathe and a milling machine to obtain a honeycomb disc having a diameter of 570 mm and a thickness of 90 mm.

This disc was disposed in an annealing box, which was made of refractory brick and filled with sand and, in this state, was subjected to firing in an electric furnace. Initially the honeycomb body was heated to 700° C. at a rate of 50° C./hr and maintained at this temperature for 50 hr to accomplish complete dissipation of the organic binder and the extrusion aid. Thereafter the temperature of the honeycomb body was raised to 1350° C. at a rate of 20° C./hr, and this temperature was maintained for 10 hr to complete sintering of the cordierite particles which constituted the heated body. After completion of the firing process, the ceramic honeycomb disc was about 505 mm in diameter and about 80 mm in thickness. Finally the fired disc was subjected to machining to obtain a ceramic honeycomb disc 10A, as shown in FIG. 8, having a diameter of 500 mm and a thickness of 75 mm.

EXAMPLE 2

A ceramic composition was prepared by mixing 68 parts by weight of powdered β-spodumene (ceramic material), 5 parts by weight of dextrin (organic binder), 2 parts by weight of microcrystalline wax (extrusion aid) and 25 parts by weight of water (solvent). Unit blocks of a honeycomb structure having 0.30 mm thick walls arranged cross-wise so as to form cross-sectionally square gas passages with a pitch of 2.5 mm were formed by extrusion molding of this ceramic composition, followed by hot air drying. The unit blocks were finished by milling each into the shape of a 90×90 mm wide and 100 mm long square prism.

A bonding agent in the form of a thin slurry was prepared by dissolving 1 part by weight of dextrin in 10 parts by weight of water and dispersing 1 part by weight of powdered β-spodumene in the aqueous dextrin solution.

The unit blocks were bonded to one another by first applying the bonding agent onto a side face of each block, leaving each block in the wetted state for about 30 sec, then contacting the wetted side face of one block with the corresponding side face of another block and thereafter drying the bonded blocks by hot air with the maintenance of a bonding pressure of about 50 g/cm². This procedure was repeated to integrate 16 pieces of unit blocks into a honeycomb structure body in the shape of an about 398×398 mm wide and 100 mm thick plate.

This honeycomb structure body was subjected to firing in an electric furnace in a state disposed in an annealing box containing sand. Initially, the body was heated to 700° C. at a rate of 50° C./hr and kept at this temperature for 35 hr to accomplish complete dissipation of the organic binder and the extrusion aid. Then the body was further heated up to 1260° C. at a rate of 20° C./hr and kept at this temperature for 10 hr thereby to complete sintering of the β-spodumene particles. A ceramic honeycomb structure body obtained through the firing process was about 353×353 mm wide and about 89 mm in thickness. Machining of this body, gave a ceramic honeycomb structure body in the shape of a 350×350×85 mm square plate.

EXAMPLE 3

A ceramic composition was prepared by mixing 70 parts by weight of cordierite, 7 parts by weight of polyvinyl butyral (binder), 7 parts by weight of dibutyl phthalate (extrusion aid) and 16 parts by weight of n-butyl alcohol (solvent). Unit blocks of a honeycomb structure having 0.30 mm thick walls arranged crosswise so as to form cross-sectionally rectangular gas passages with a longer pitch of 4 mm and a shorter pitch of 2.5 mm were formed by extrusion molding of this composition, followed by drying by a high frequency heating method. The dried unit blocks were divided into two groups and machined such that the first group of unit blocks were finished each into the shape of a 85×85×100 mm square prism and the second group each into the shape of a 85×43×100 mm square prism.

Referring to FIGS. 9(A) and 9(B), 7 pieces of the first group unit blocks 20E were bonded in a row into a honeycomb block 22A by the bonding procedure of Example 1 except that n-butyl alcohol was used in place of water and that the two-minute period in Example 1 was extended to 3 minutes, and, separately, 6 pieces of the first group blocks 20E and 2 pieces of the second group blocks 20F were integrated into a honeycomb block 22B by the same bonding procedure. Then, 4 pieces of the first medium-sized blocks 22A and 3 pieces of the second medium-sized blocks 22B were bonded together in their longer side faces in an alternate arrangement as shown in FIG. 10, so that a honeycomb structure body 10B in the shape of an about 580×580 mm wide and 100 mm thick square plate was produced.

This honeycomb structure body 10B was subjected to a firing process identical with the firing process in Example 1, resulting in that the body 10B turned into a perfectly ceramic and wholly homogeneous body. Thereafter the fired body was machine-finished into a 500×500×90 mm square plate of a ceramic honeycomb structure.

What is claimed is:

1. A method of producing a large-sized body of a ceramic honeycomb structure, comprising the steps of:
    integrating a plurality of unit blocks each having a prismatic shape and a honeycomb structure providing a number of continuous and axially extending gas passages into a large-sized body of a desired shape by bonding said unit blocks to one another with a bonding agent, said unit blocks being formed by extrusion molding of a ceramic composition comprising a powdered ceramic material, an organic binder material, which can be entirely converted into gaseous substances and dissipated by firing, and a solvent for said binder material and thereafter dried with resultant evaporation of said solvent, said bonding agent comprising only two essential components one of which is said organic binder material and the other is a liquid which serves as a solvent for said binder material;
    drying said large-sized body so as to evaporate said liquid in said bonding agent;
    heating the dried large-sized body to a first temperature so as to gasify and dissipate said binder material; and
    firing the heated large-sized body at a second temperature higher than said first temperature so as to cause sintering of said ceramic material constituting the integrated unit blocks thereby to convert the large-sized body into an entirely and homogeneously ceramic honeycomb structure body.

2. A method according to claim 1, wherein said ceramic composition to be extruded comprises 3 to 15 Wt% of said binder material, 10 to 30 Wt% of said solvent and the balance of said powdered ceramic material.

3. A method according to claim 2, wherein said ceramic composition to be extruded further comprises up to 3 Wt% of an organic additive which serves as an extrusion aid and can entirely be converted into gaseous substances at said first temperature.

4. A method according to claim 1, wherein said unit blocks are bonded to one another by applying a solution of said binder material in said liquid onto a side face of each unit block, and then contacting the wetted side face of each unit block with the wetted side face of another unit block.

5. A method according to claim 4, wherein said solution contains said powdered ceramic material dispersed therein.

6. A method according to claim 1, wherein said unit blocks are bonded to one another by applying said liquid alone onto a side face of each unit block, leaving each unit block in the wetted state for a predetermined period of time until the wetted face becomes pasty and a portion of said binder material present in each unit block dissolves into the applied liquid and thereafter contacting the wetted and pasty side face of each unit block with the wetted and pasty side face of another unit block.

7. A method according to claim 1, wherein said unit blocks are bonded to one another by applying a slurry of said powdered ceramic material dispersed in said liquid onto a side face of each unit block, leaving each unit block in the wetted state for a predetermined period of time until the wetted face becomes pasty and a portion of said binder material present in each unit block dissolves into the applied slurry and thereafter contacting the wetted and pasty side face of each unit block with the wetted and pasty side face of another unit block.

8. A method according to claim 1, wherein the heating and firing steps are performed by gradually heating said large-sized body to said first temperature, keeping the heated body at said first temperature for a first predetermined period of time, thereafter gradually raising the temperature of the heated body to said second temperature and keeping the heated body at said second temperature for a second predetermined period of time.

9. A method according to claim 8, wherein the temperature is raised from said first temperature to said second temperature at a rate lower than the rate of temperature rise during the heating to said first temperature.

10. A method according to claim 1, wherein said unit blocks are all similar in cross-sectional shape.

11. A method according to claim 1, wherein said unit blocks consist of at least one group of unit blocks each having a first cross-sectional shape and another group of unit blocks each having a second cross-sectional shape different from said first cross-sectional shape.

12. A method according to claim 1, further comprising the step of machining said large-sized body after the drying step but before the heating step to adjust the shape and dimensions of said body.

13. A method according to claim 1, wherein said powdered ceramic material is selected from the group consisting of β-spodumene, petalite, β-eucryptite, cordierite and aluminum silicate.

14. A method according to claim 13, wherein said binder material is selected from the group consisting of methyl cellulose, wheat flour, dextrin, starch, lignin extracts, spent pulp liquor, gum arabic, gutta-percha rubber, tragacanth gum, polyvinyl alcohol, polyvinyl butyral, methylethyl cellulose, ceresin, casein, cellulose acetate, acrylic resins, phenolic resins and vinyl resins.

15. A method of producing a one-piece body of a ceramic honeycomb structure which serves as an axial-flow type heat exchanger element, the method comprising the steps of:
  (a) preparing a ceramic composition by mixing a powdered ceramic material, an organic binder material which can entirely be converted into gaseous substances and dissipated by firing, a solvent for said binder material and at least one kind of additive which serves as an extrusion aid;
  (b) extruding said ceramic composition to form a plurality of unit blocks each having a prismatic shape and a honeycomb structure which provides a number of continuous, parallel and axially extending gas passages;
  (c) drying said unit blocks at a relatively low temperature so as to evaporate said solvent contained in each unit block without any chemical changes of said ceramic material or said binder material;
  (d) machining the dried unit blocks to eliminate possible deformations and distortions;
  (e) selecting at least two of the dried and machined unit blocks and applying a liquid which serves as a solvent for said binder material to a side face of each of the selected unit blocks such that said side face is wetted with said liquid and made sticky by dissolution of said binder material present in a surface region of the unit block in the applied liquid;
  (f) bonding the selected unit blocks to one another by contacting the liquid-applied side face of each unit block with the liquid-applied side face of another unit block such that said gas passages in the integrated unit blocks all extend in the same direction;
  (g) repeating the steps (e) and (f) until a predetermined number of unit blocks are integrated into a one-piece body of a desired shape in such an arrangement that said gas passages in the unit blocks constituting said one-piece body all extend in the same direction;
  (h) drying said one-piece body so as to evaporate said liquid used for bonding;
  (i) heating the dried one-piece body to a first temperature so as to gasify and dissipate said binder material;
  (j) firing the heated one-piece body to a second temperature higher than said first temperature so as to cause sintering of said ceramic material constituting the integrated unit blocks to thereby convert said one-piece body into an entirely and homogeneously ceramic honeycomb structure body; and
  (k) machining said ceramic honeycomb structure body to finish it to a desired shape and desired dimensions.

16. A method according to claim 15, wherein said liquid consists of said solvent.

17. A method according to claim 15, wherein said liquid is a solution of said binder material in said solvent.

18. A method according to claim 15, wherein said liquid is a slurry prepared by dispersing said powdered ceramic material in a solution of said binder material in said solvent.

* * * * *